(12) United States Patent
Liedtke et al.

(10) Patent No.: US 7,650,876 B2
(45) Date of Patent: Jan. 26, 2010

(54) FUEL PUMP SHAFT AND PUMP MOUNTING IN ENGINE BLOCK

(75) Inventors: Jennifer L. Liedtke, Rochester Hills, MI (US); Clyde A. Bulloch, Hartland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/100,871

(22) Filed: Apr. 10, 2008

(65) Prior Publication Data

US 2009/0255514 A1  Oct. 15, 2009

(51) Int. Cl.
*F02M 37/04* (2006.01)
(52) U.S. Cl. ...................................................... 123/509
(58) Field of Classification Search .................. 123/509
See application file for complete search history.

(56) References Cited

U.S. PATENT DOCUMENTS

| | | | | |
|---|---|---|---|---|
| 2,882,884 A * | 4/1959 | Scheiterlein | ................ | 123/373 |
| 2,890,690 A * | 6/1959 | Dolza | ................ | 123/445 |
| 2,921,567 A * | 1/1960 | Medenus | ................ | 123/54.4 |
| 3,363,710 A * | 1/1968 | Fager | ................ | 180/69.4 |
| 4,054,108 A * | 10/1977 | Gill | ................ | 123/54.4 |
| 4,080,945 A * | 3/1978 | Hikosaka et al. | ................ | 123/195 C |
| 4,129,043 A * | 12/1978 | Ishikawa | ................ | 123/198 R |
| 4,412,513 A * | 11/1983 | Obermayer et al. | ................ | 123/54.4 |
| 4,516,546 A * | 5/1985 | Choushi et al. | ................ | 123/195 A |
| 4,615,308 A * | 10/1986 | Asanomi et al. | ................ | 123/90.27 |
| 5,479,903 A * | 1/1996 | Werner et al. | ................ | 123/509 |
| 5,564,380 A * | 10/1996 | Kobayashi et al. | ................ | 123/192.2 |
| 5,564,395 A * | 10/1996 | Moser et al. | ................ | 123/509 |
| 5,992,393 A * | 11/1999 | Yoshida et al. | ................ | 123/509 |
| 6,148,787 A * | 11/2000 | Takano | ................ | 123/195 A |
| RE37,348 E * | 9/2001 | Kaku et al. | ................ | 123/495 |
| 6,474,305 B1 * | 11/2002 | Kimura | ................ | 123/456 |
| 6,568,363 B2 * | 5/2003 | Koyama et al. | ................ | 123/195 A |
| 6,669,453 B1 * | 12/2003 | Breeden et al. | ................ | 417/364 |
| 6,904,885 B2 * | 6/2005 | Osband | ................ | 123/195 R |
| 6,976,476 B1 * | 12/2005 | Mantri | ................ | 123/508 |

* cited by examiner

*Primary Examiner*—Thomas N Moulis
(74) *Attorney, Agent, or Firm*—Harness, Dickey & Pierce, P.L.C.

(57) ABSTRACT

An engine assembly may include an engine block, a fuel pump, and a drive shaft. The engine block may include first and second banks defining first and second sets of cylinders disposed at an angle relative to one another to form a V-configuration. The engine block may include a valley between the first and second banks of cylinders. The fuel pump may be supported by the engine block and located within the valley. The drive shaft may be supported by the engine block and may be drivingly engaged with the fuel pump.

19 Claims, 3 Drawing Sheets

FUEL PUMP SHAFT AND PUMP MOUNTING IN ENGINE BLOCK

FIELD

The present disclosure relates to engine fuel pump assemblies, and more specifically to engine fuel pump mounting and drive systems.

BACKGROUND

The statements in this section merely provide background information related to the present disclosure and may not constitute prior art.

Engine assemblies may include fuel systems that incorporate a variety of types of fuel pumps to provide a pressurized fuel supply. High pressure fuel pumps may be used in direct-injection engines. High pressure fuel pumps may typically be mounted in the cylinder head and may be driven by the camshaft of an overhead cam configured engine assembly.

SUMMARY

An engine assembly may include an engine block, a fuel pump, and a drive shaft. The engine block may include first and second banks defining first and second sets of cylinders disposed at an angle relative to one another to form a V-configuration. The engine block may include a valley between the first and second banks of cylinders. The fuel pump may be supported by the engine block and located within the valley. The drive shaft may be supported by the engine block and may be drivingly engaged with the fuel pump.

The first and second banks of cylinders may define first and second side walls. The engine block may further include a first end wall extending between a first end of the first and second banks of cylinders and a second end wall extending between a second end of the first and second banks of cylinders. The fuel pump may be located between the first and second end walls of the engine block.

An engine block may include a first bank defining a first set of cylinders, a second bank defining a second set of cylinders disposed at an angle relative to the first bank to form a V-configuration, a valley defined between the first and second banks of cylinders, and a fuel system support structure. The fuel system support structure may be located within the valley and may include a fuel pump mount member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
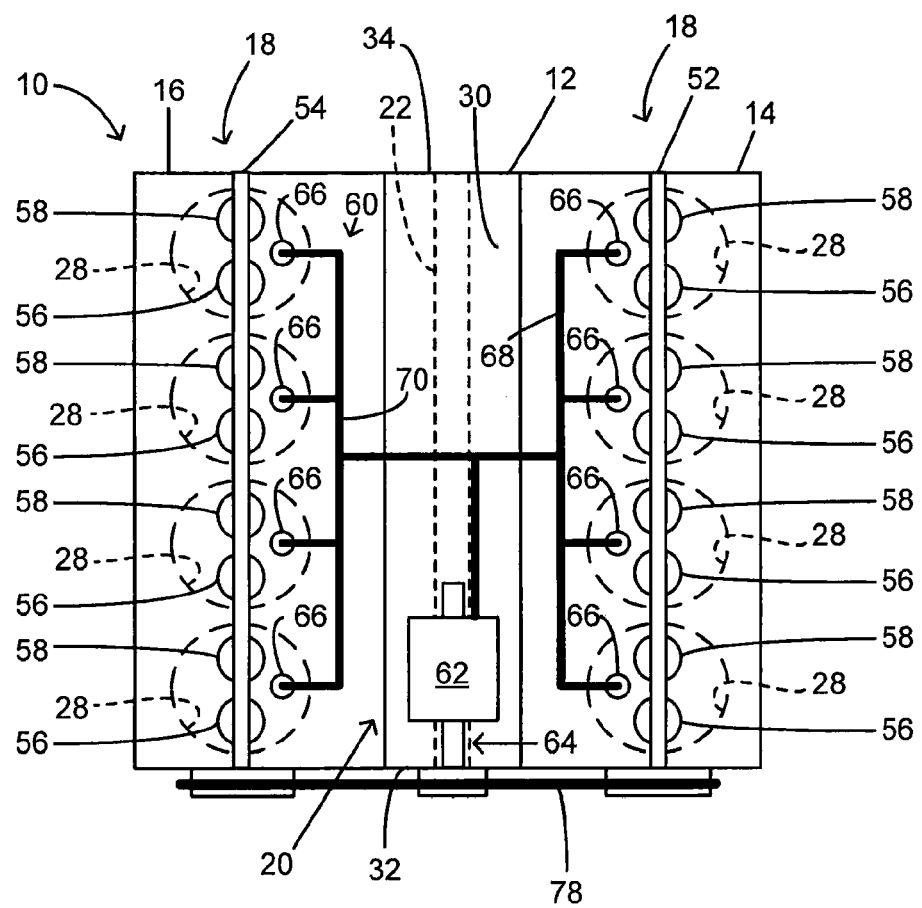
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Figure 2:
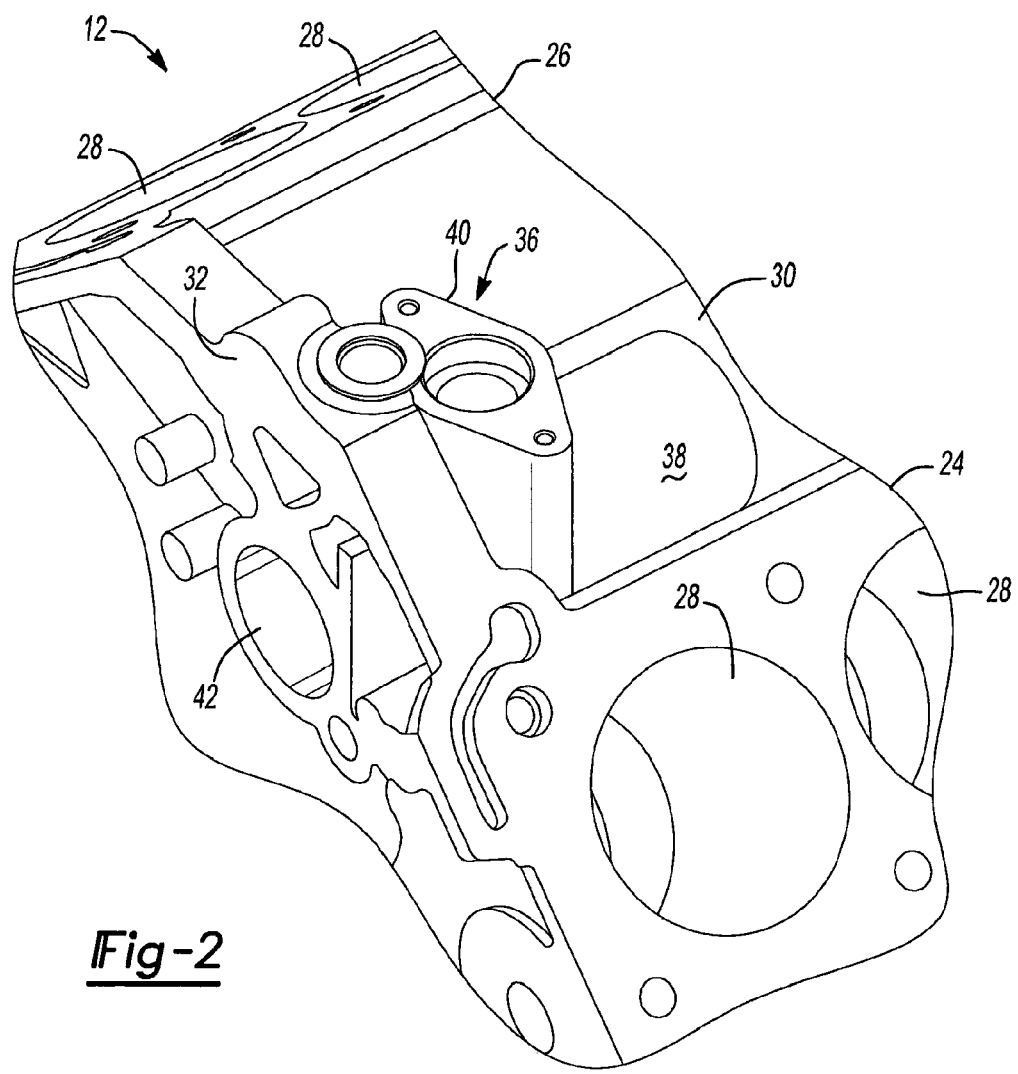
FIG. 2 is a fragmentary perspective view of the engine block of FIG. 1.
Figure 3:
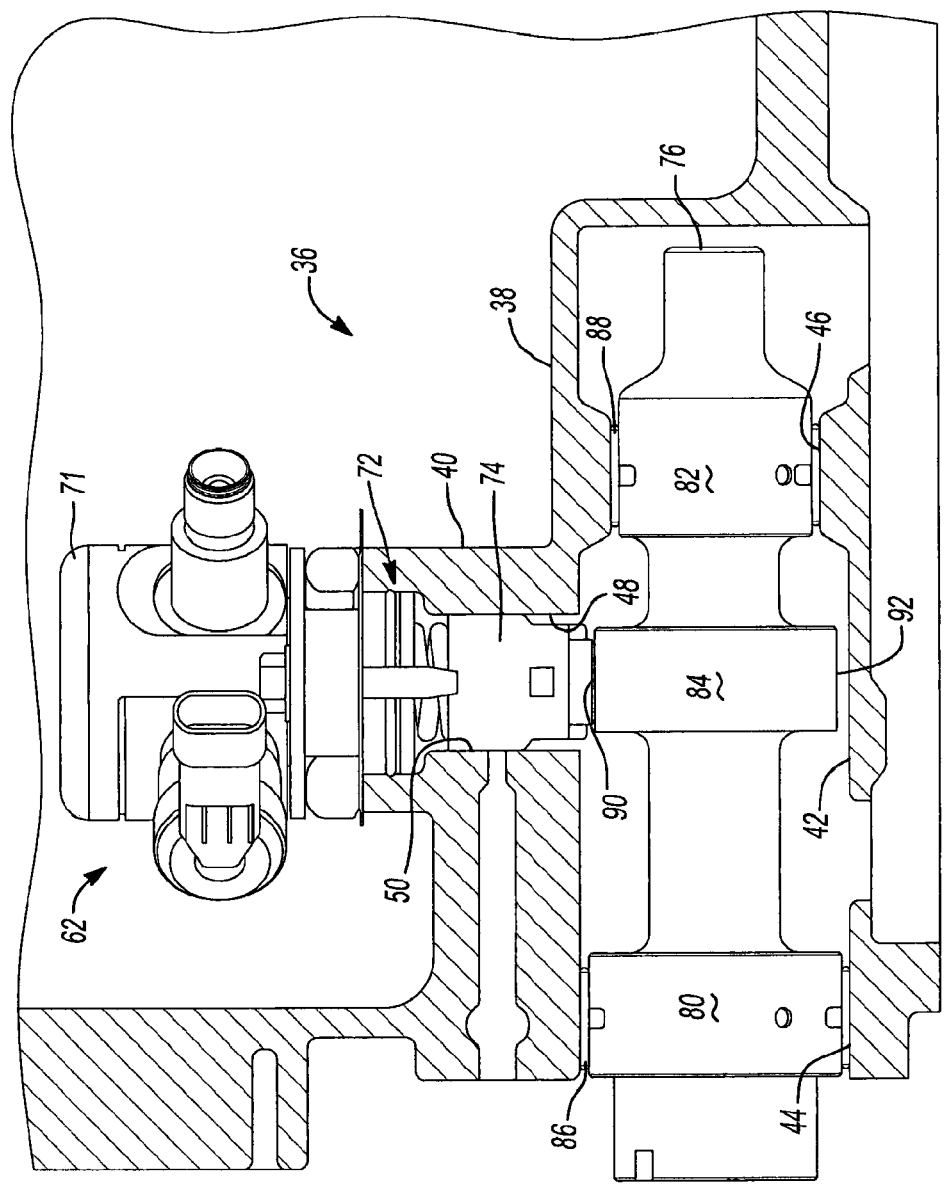
FIG. 3 is a fragmentary section view of the engine assembly of FIG. 1.

Referring now to FIGS. 1-3, an exemplary engine assembly 10 is schematically illustrated. The engine assembly 10 may include an engine block 12, first and second cylinder heads 14, 16, a valvetrain assembly 18, a fuel system 20, and a crankshaft 22.

As seen in FIG. 2, the engine block 12 may be a cast structure and may include first and second banks 24, 26 of cylinders 28. The first and second banks 24, 26 may be disposed at an angle relative to one another to form a V-configuration that defines a valley 30 between the first and second banks 24, 26. The crankshaft 22 may be rotatably supported by the engine block 12 below the valley 30. A first wall 32 may extend between the first and second banks 24, 26 at a first end of the valley 30 and a second wall 34 may extend between the first and second banks 24, 26 at a second end of the valley 30. The engine block 12 may further include a fuel system support structure 36 that is located within the valley 30 between the first and second banks 24, 26 and between the first and second walls 32, 34.

As seen in FIGS. 2 and 3, the fuel system support structure 36 may include a shaft housing 38 and a pump mount member 40. The shaft housing 38 may define a bore 42 that includes first and second bearing regions 44, 46 and an opening 48 that extends into the shaft housing 38 and is located axially between the first and second bearing regions 44, 46. The pump mount member 40 may extend from the shaft housing 38 and may include an opening 50 aligned with the opening 48 in the shaft housing 38.

Referring back to FIG. 1, the first cylinder head 14 may be fixed to the first bank 24 of engine block 12 and the second cylinder head 16 may be fixed to the second bank 26. The valvetrain assembly 18 may include a first camshaft 52 that is supported by the first cylinder head 14 and a second camshaft 54 that is supported by the second cylinder head 16 to form an overhead cam engine configuration. The valvetrain assembly 18 may further include intake and exhaust valves 56, 58 for each cylinder 28 that are actuated by the first and second camshafts 52, 54.

Referring to FIGS. 1 and 3, the fuel system 20 may include a fuel delivery system 60, a fuel pump 62, and a fuel pump drive system 64. The fuel delivery system 60 may include fuel injectors 66 and first and second fuel rails 68, 70. The first and second fuel rails 68, 70 may be in communication with the fuel injectors 66 to provide fuel to each of the cylinders 28. The fuel injectors 66 may include direct-injection fuel injectors that are in direct communication with the cylinders 28 to form a direct-injection fuel system.

The fuel pump 62 may be in communication with the first and second fuel rails 68, 70 to provide a pressurized fuel supply to the cylinders 28. The fuel pump 62 may be fixed to the pump mount member 40 fixed in the valley 30 of the engine block 12. The fuel pump 62 may therefore be surrounded by the cast structure of the engine block 12. For example, the fuel pump 62 may be located between the first and second banks 24, 26 of cylinders 28 and between the first and second walls 32, 34.

The fuel pump 62 may include a pump mechanism 71 and a drive mechanism 72. The pump mechanism 71 may include a reciprocating pump fixed to the pump mount member 40 and the drive mechanism 72 may include a lifter mechanism 74 that extends through the openings 48, 50 in the fuel system support structure 36 and engages the fuel pump drive system

64. The fuel pump 62 may include a high pressure fuel pump that operates at pressures greater than 10,000 kilopascal (kPa).

The fuel pump drive system 64 may include a drive shaft 76 that is driven by the crankshaft 22. The drive shaft 76 may be located within the bore 42 of the shaft housing 38 and may be engaged with the crankshaft 22 through a belt arrangement 78. For example, the belt arrangement 78 may include an accessory drive belt that is drivingly engaged with the drive shaft 76 and the first and second camshafts 52, 54. The drive shaft 76 may be driven at a rotational speed that is less than the rotational speed of the crankshaft 22 and greater than the rotational speed of the first and second camshafts 52, 54. In the present example, the first and second camshafts 52, 54 may be driven at one-half of the rotational speed of the crankshaft 22. In another non-limiting example, the drive shaft 76 may be driven at two-thirds of the rotational speed of the crankshaft 22.

The drive shaft 76 may include first and second bearing portions 80, 82 and a lobed portion 84. The first bearing portion 80 may be rotatably supported by a first bearing 86 at the first bearing region 44 of the shaft housing 38 and the second bearing portion 82 may be rotatably supported by a second bearing 88 at the second bearing region 46 of the shaft housing 38. The lobed portion 84 may be located axially between the first and second bearing portions 80, 82 and may be aligned with the openings 48, 50 in the fuel system support structure 36. The lobed portion 84 may include first and second lobes 90, 92. The drive mechanism 72 of the fuel pump 62 may be engaged with the lobed portion of the drive shaft 76. The present example shows the lifter mechanism 74 being displaced by the first and second lobes 90, 92 to drive the pump mechanism 71. The lobed portion 84 may reciprocate the drive mechanism 72 twice per revolution of the drive shaft 76.

The fuel system 20 may additionally include an optional sound attenuating material (not shown) located within the valley 30 of the engine block 12 that may surround the fuel pump 62 to attenuate noise generated by the fuel pump 62. The location of the fuel pump 62 within the valley 30 of the engine block 12 provides a number of advantages including, but not limited to, providing a housing location for the sound attenuating material. The fuel pump location may additionally use the engine block 12 as a protective housing for the fuel pump 62.

What is claimed is:

1. An engine assembly comprising:
   an engine block including first and second banks defining first and second sets of cylinders disposed at an angle relative to one another to form a V-configuration, the engine block including a valley between the first and second banks of cylinders;
   a first cylinder head fixed to the first bank of cylinders;
   a second cylinder head fixed to the second bank of cylinders;
   a first camshaft rotatably supported by the first cylinder head;
   a second camshaft rotatably supported by the second cylinder head;
   a fuel pump supported by the engine block and located within the valley; and
   a drive shaft supported by the engine block and drivingly engaged with the fuel pump.

2. The engine assembly of claim 1, further comprising a crankshaft rotatably supported by the engine block and drivingly engaged with the drive shaft.

3. The engine assembly of claim 2, wherein the drive shaft is driven at a rotational speed that is less than the full rotational speed of the crankshaft and greater than one-half of the rotational speed of the crankshaft.

4. The engine assembly of claim 1, wherein the fuel pump is a reciprocating pump.

5. The engine assembly of claim 4, wherein the drive shaft includes a lobed portion engaged with the fuel pump.

6. The engine assembly of claim 1, further comprising a sound attenuating material located proximate the fuel pump to attenuate noise generated by the fuel pump.

7. The engine assembly of claim 6, wherein the sound attenuating material is located within the valley.

8. The engine assembly of claim 1, further comprising a series of direct injection fuel injectors that are in communication with the fuel pump and the first and second banks of cylinders.

9. An engine assembly comprising:
   an engine block including first and second banks defining first and second sets of cylinders disposed at an angle relative to one another to form a V-configuration, the engine block including a valley between the first and second banks of cylinders, the valley including first and second side walls defined by the first and second banks of cylinders, a first end wall extending between a first end of the first and second banks of cylinders and a second end wall extending between a second end of the first and second banks of cylinders, and a floor, the first and second side walls extending from the first end of the first and second banks of cylinders to the second end of the first and second banks of cylinders;
   a first cylinder head fixed to the first bank of cylinders;
   a second cylinder head fixed to the second bank of cylinders;
   a first camshaft rotatably supported by the first cylinder head;
   a second camshaft rotatably supported by the second cylinder head;
   a fuel pump fixed within the valley and located between the first and second side walls and between the first and second end walls of the engine block; and
   a drive shaft supported by the engine block and drivingly engaged with the fuel pump.

10. The engine assembly of claim 9, wherein the engine block includes a fuel system support structure that extends from the floor of the valley, the fuel pump being fixed to the fuel system support structure.

11. The engine assembly of claim 10, wherein the engine block is a cast part and the fuel system support structure is integrally cast with the remainder of the engine block.

12. The engine assembly of claim 10, wherein the fuel system support structure includes a shaft housing and a pump mount member extending from the shaft housing, the drive shaft being rotatably housed within the shaft housing.

13. The engine assembly of claim 12, wherein the fuel system support structure includes an opening extending through the pump mount member and the shaft housing, the fuel pump including a drive member that extends through the opening and is engaged with the drive shaft.

14. An engine block for an overhead cam engine comprising:
   a first bank defining a first set of cylinders and adapted to have a first cylinder head that supports a first camshaft mounted thereto;
   a second bank defining a second set of cylinders disposed at an angle relative to the first bank to form a V-configuration, the second bank adapted to have a second cylinder head that supports a second camshaft mounted thereto;

a valley defined between the first and second banks of cylinders; and a fuel system support structure located within the valley that includes a shaft housing and a fuel pump mount member extending from the shaft housing, the shaft housing adapted to support a drive shaft for a fuel pump.

15. The engine block of claim 14, wherein the pump mount member includes an opening that extends into the shaft housing.

16. The engine block of claim 14, further comprising a first end wall extending between the first end of the first and second banks of cylinders and a second end wall extending between the second end of the first and second banks of cylinders.

17. The engine block of claim 1, wherein the fuel system support structure is located between the first and second end walls.

18. The engine block of claim 14, wherein the engine block is a cast part and the fuel system support structure is integrally cast with the remainder of the engine block.

19. The engine assembly of claim 1, wherein a height of the first and second banks extends beyond me fuel pump to form a protective housing for the fuel pump.

* * * * *